No. 611,715. Patented Oct. 4, 1898.
R. H. SOUTHALL.
TIRE AND WHEEL FOR BICYCLES.
(Application filed May 2, 1898.)
(No Model.)
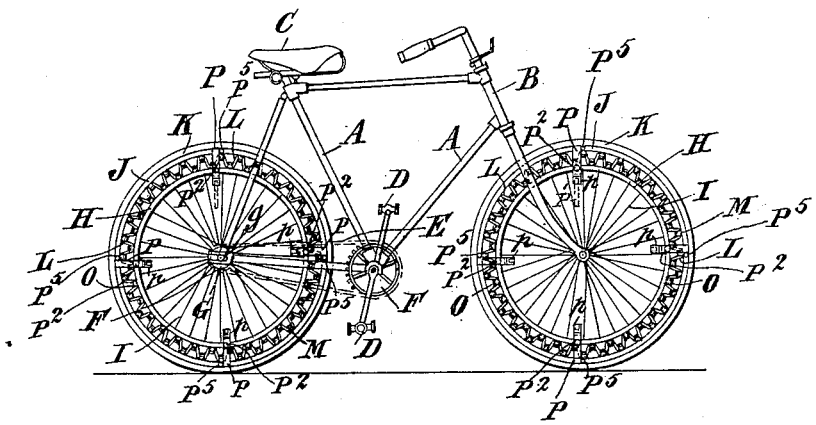
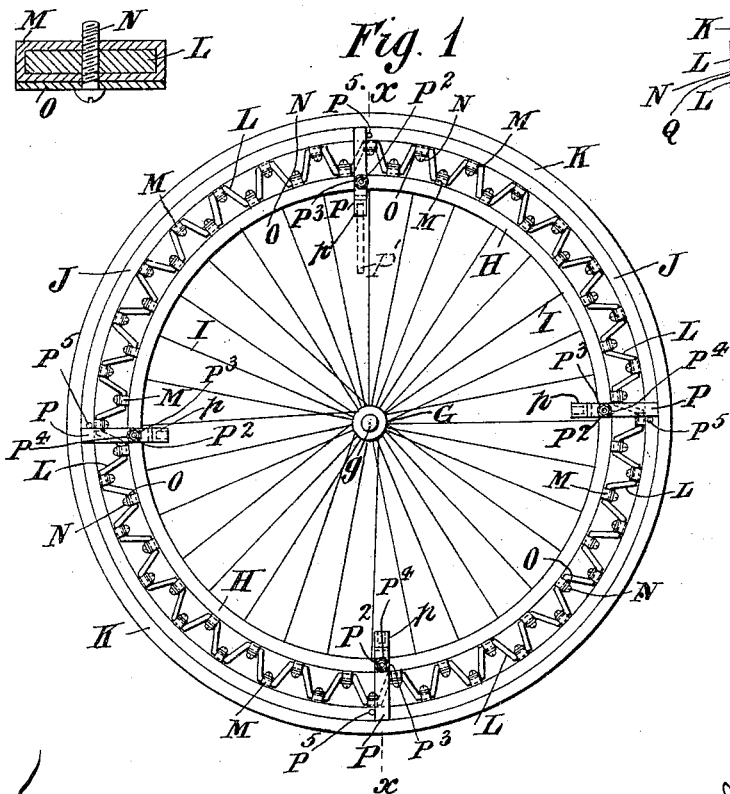
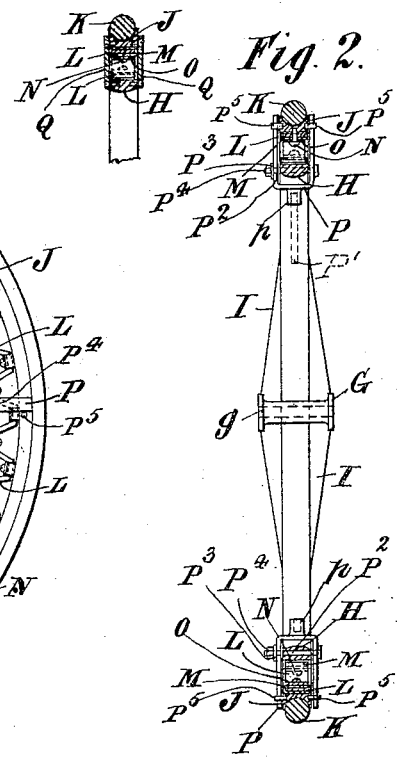
Witnesses
William Sadler
Adam C Hart
Inventor
Robert Heap Southall
by
H. Fairbairn Hart
Attorney

UNITED STATES PATENT OFFICE.

ROBERT HEAP SOUTHALL, OF LEEDS, ENGLAND.

TIRE AND WHEEL FOR BICYCLES.

SPECIFICATION forming part of Letters Patent No. 611,715, dated October 4, 1898.

Application filed May 2, 1898. Serial No. 679,501. (No model.)

*To all whom it may concern:*

Be it known that I, ROBERT HEAP SOUTHALL, a subject of the Queen of Great Britain, residing at Leeds, in the county of York, England, have invented new and useful improvements in or relating to tires and wheels of bicycles, tricycles, and road-vehicles, such as cabs, gigs, broughams, vans, bath-chairs, and other like machines and vehicles, of which the following is a specification.

This invention relates to improvements in the tires and wheels of bicycles, tricycles, road-vehicles, such as cabs, gigs, broughams, vans, bath-chairs, and other like machines and vehicles.

Hitherto wheels used for the above machines or vehicles have either been constructed with the tire thereof mounted directly on the rim to which the hub is attached by means of the spokes, or when the tire has been mounted upon a separate rim springs under compression have been interposed between the two rims, the necessary resiliency in this latter case being obtained by the compression of the said springs.

Now the object of this invention is the suspension of the rim of the wheel to which the spokes and hub are attached (hereinafter termed the "center" rim) from a second ring or rim (hereinafter termed the "tire-rim,") upon which the tire of the wheel is mounted, such means of suspension taking the form, say, of a series of springs constructed as hereinafter described, and arranged by their tension to draw the center rim, to which the spokes and hub are attached toward the tire-rim, and by so suspending the center rim all the advantages and resiliency of a pneumatic tire are obtained without the tire being so liable to become punctured. I attain these objects by the arrangement illustrated in the accompanying drawings, in which—

Figure 1 is a side elevation of a wheel constructed according to this invention; Fig. 2, a sectional elevation on line *x x*, Fig. 1; Fig. 3, a part sectional elevation of wheel provided with side flanges; Fig. 4, a side elevation of a bicycle with wheels constructed according to this invention; Fig. 5, an enlarged transverse section of a detail.

Similar letters refer to similar parts throughout the several views.

A is the framework, B the handle-bar and fork, C the saddle, D the pedals, E the driving-chain working over the chain-wheels F, all of which parts are of the usual and ordinary construction.

The wheels are constructed as follows: G is the hub of the wheel, provided with the usual central hole *g* for mounting it upon the axle of the machine or vehicle in the usual and ordinary manner. The hub G is adjustably or otherwise connected to the center rim H by the spokes I by any convenient method—such as, for example, say, by screwing. The center rim H is preferably, though not necessarily so, rectangular in cross-section.

The tire-rim J may or may not be suitably grooved on its outer periphery for receiving the tire, while its inner periphery is preferably, though not necessarily so, made at or about, say, a right angle to its sides. The diameter of the inner periphery of the tire-rim J is greater than the outer periphery of the center rim H.

The tire K, which is mounted upon the outer periphery of the tire-rim J in any convenient manner, may be formed of a band or ring of india-rubber of any suitable or desired shape in cross-section—such as, for example, say rectangular, circular, either solid or hollow, or a combination of the two—or, if so desired, a pneumatic tire may be employed; but I have found that satisfactory results may be obtained from the use of a circular solid rubber tire. In the space, varying from, say, one inch upward, between the inner periphery of the tire-rim J and outer periphery of the center rim H is arranged a series of springs L, formed out of a band of any flexible and expanding material—such as, say, rubber of any suitable thickness, flexibility—and preferably, though not necessarily so, rectangular in cross-section. The said band may be either in one piece or made up in a number of sections of any convenient length or lengths and of the same width, or nearly so, as that of the rims H and J. The said rubber band, whether formed in one continuous piece or strip or in sections, is first fastened or fixed at any predetermined number of points—say, for example, thirty-two, more or less—equidistant apart loosely to the outer periphery of the center rim H. After the band has been fixed as described the portion thereof between each two points of fixture is raised loop-like, drawn taut, and fixed to the inner periphery of the tire-rim J at a point centrally between the two points of fixture on the central rim H, thereby forming a couple of springs L at tension and at an angle to each other and more or less at a tangent to the periphery of the central rim H, or the springs L may be arranged nearly parallel to each other. Each successive portion of the band is then similarly fixed to the tire-rim J until the whole band is fixed in position, whereby the central rim H is firmly held in suspension by the taut tension-springs L and retained in a central position to the tire K. The action of each two springs L is to draw that portion of the central rim H toward the tire-rim J, while the springs directly opposite are pulling in a contrary direction.

A convenient method of fixing the band L respectively to the peripheries of the central rim H and tire-rim J is as follows: At each point of connection the band L may be wrapped with a piece of, say, canvas M, as shown in enlarged cross-section at Fig. 5, to preserve it from damage, and the rubber and canvas are fixed securely to the said rim by a set-screw N, passing through a clamping-plate O.

In order to avoid undue strain upon the springs L, as well as to insure the tire K and its rim J rotating synchronously with the hub G and central rim H, at any desired number of points—say, for example, four—may be pivoted by bolts or studs $P^2$ to the sides of the central rim H a number of bifurcated levers P, each armed with a boss $p$, having a central hole in which may be inserted a rod or lever P' (shown in dotted lines at Fig. 1) for actuating purposes. The bifurcated end of each lever P is made to embrace both the central rim H and tire-rim J and to engage with a projection or pin $P^5$, arranged on each side of the tire-rim J. The pivot bolt or stud $P^2$ is armed with a leather or other washer $P^3$ and nut $P^4$ for securely clamping the levers P in position. The said levers may also be used for tightening the springs L, should such become necessary, by moving the tire K and its rim J slightly around the central rim H.

If desired, a flange Q may be fixed to each side of the central rim H by, say, set-screws and arranged to project a suitable distance onto the tire-rim J for covering the space between the rims H and J and in which the springs L are fixed.

The central rim H and tire-rim J may be formed of metal, wood, or other suitable material of any required thickness and flexibility.

Having now particularly described the nature of my said invention, what I claim, and desire to secure by Letters Patent, is—

1. In a wheel, the combination of a rubber tire seated upon a rim, a central rim of smaller diameter than the tire-rim, a series of tension-springs interposed in the space between the said two rims, said tension-springs being composed of a rubber band fixed at equidistant points to the central rim and its loops fixed to the tire-rim for suspension purposes, a hub, spokes for connecting the hub and central rim together, bifurcated levers pivoted to said central rim and pins fixed on each side of the tire-rim with which the ends of the bifurcated levers engage, substantially as described.

2. In a wheel, the combination of a rubber tire seated upon a rim, a central rim of smaller diameter than the tire-rim, and armed with flanges on each side thereof, a series of tension-springs interposed in the space between the said two rims, said tension-springs being composed of a rubber band fixed at equidistant points to the central rim and its loops fixed to the tire-rim for suspension purposes, a hub, spokes for connecting the hub and central rim together, bifurcated levers pivoted to said central rim and pins fixed on each side of the tire-rim with which the ends of the bifurcated levers engage, substantially as described.

In witness whereof I have hereunto set my hand in presence of two witnesses.

ROBERT HEAP SOUTHALL.

Witnesses:
WILLIAM SADLER,
ALAN BALCH.